United States Patent [19]

Schulz

[11] 3,762,671

[45] Oct. 2, 1973

[54] ENGINE MOUNT ASSEMBLY

[75] Inventor: John C. Schulz, Franklin, Ohio

[73] Assignee: General Motors Corporation, Detroit, Mich.

[22] Filed: Aug. 4, 1972

[21] Appl. No.: 278,043

[52] U.S. Cl. .................................. 248/9, 180/64 R
[51] Int. Cl. ............................................. F16m 5/00
[58] Field of Search ......................... 248/9, 5, 8, 10, 248/15, 20, 21, 22, 24; 180/64 R; 267/153, 151, 152, 21, 30, 33, 63

[56] References Cited
UNITED STATES PATENTS

| 3,242,877 | 3/1966 | Hirst et al. | 267/63 R X |
| 372,566 | 11/1887 | Rice | 254/104 |
| 1,006,974 | 10/1911 | Moore et al. | 254/104 |
| 2,574,602 | 11/1951 | Thomas | 248/358 R X |
| 2,318,862 | 5/1943 | Iredell et al. | 248/5 |

FOREIGN PATENTS OR APPLICATIONS 270,519   5/1927   Great Britain ................... 180/64 R Primary Examiner—J. Franklin Foss
Attorney—J. L. Carpenter et al.

[57] ABSTRACT

An engine mount assembly for resiliently supporting an engine on a frame of a motor vehicle comprising two pairs of resilient pads which are molded at their outer surfaces to the interior of a sleeve and at their inner surfaces define an opening extending longitudinally of the sleeve. A wedge assembly is mounted in the opening interior of the resilient pads and is expandable to simultaneously compress one pair of the resilient pads to increase the spring rate of these pads without changing the spring rate of the other pair of resilient pads.

2 Claims, 4 Drawing Figures

PATENTED OCT 2 1973 3,762,671

ENGINE MOUNT ASSEMBLY

This invention relates to an engine mount assembly and more particularly to an engine mount assembly having an adjustable spring rate.

In motor vehicles it is customary practice to isolate engine vibrations from the passenger compartment by the use of resilient motor mounts that support the engine on the vehicle frame and cushion the engine's vertical, lateral, fore and aft, and roll movements. Since the engine's vibrations will vary substantially in frequency and amplitude with different engine- vehicle combinations, engine mounts with a non-adjustable rate have very limited application. In view of the large number of different systems there has been a desire for a universal type engine mount that can be tuned to the different vibration systems; however, such mounts to date have generally been complicated and costly.

The engine mount assembly according to the present invention includes an outer sleeve in which is mounted a rubber section that forms two pairs of resilient pads that are each molded at their outer surface to the interior of the sleeve with the pads in each pair arranged opposite each other. These resilient pads define at their inner surfaces an opening extending longitudinally of the sleeve and in this opening there is mounted a wedge assembly. The wedge assembly comprises three wedge blocks with one wedge block arranged between the other two. The center wedge block has oppositely inclined ramps which mate with ramps on the other two wedge blocks. A rod extends through aligned openings in the wedge blocks and is threaded at its opposite ends to nuts which apply oppositely directed forces on the wedge block assembly to force the center wedge block to move in one direction to compress one of the resilient pads while forcing the other two wedge blocks to move in the opposite direction to compress the oppositely arranged resilient pad whereby the spring rate provided by this pair of resilient pads is increased without changing the spring rate of the other pair of resilient pads. In a vehicle installation the sleeve may be attached to the vehicle frame and the wedge block assembly attached by a mounting bracket to the engine with the engine mount arranged so that the adjustable spring rate is effective to control both vertical and lateral engine movements, this rate in this directional sense being commonly referred to as the compression rate of the engine mount assembly and that rate over which control is particularly desirable from the standpoint of tuning to different vibration systems.

An object of the present invention is to provide a new and improved engine mount assembly for resiliently supporting an engine on a frame of a motor vehicle.

Another object is to provide an engine mount assembly for resiliently supporting an engine on a frame of a motor vehicle having an expansible mechanism for compressing a pair of premolded resilient bodies in opposite directions to increase their spring rate.

Another object is to provide an engine mount assembly for resiliently supporting an engine on a frame of a motor vehicle including a sleeve having a resilient body arrangement molded therein providing two pairs of resilient pads whose inner surfaces define an opening extending through the sleeve and an expansible wedge mechanism mounted in the opening interior of the resilient body and expansible in opposite directions to compress one pair of the resilient pads to thereby increase their spring rate without changing the spring rate of the other pair of resilient pads and wherein the sleeve serves as one attaching member in the installation and the wedge mechanism serves as the other.

These and other objects of the present invention will be more apparent from the following description and drawing in which.

Figure 1:
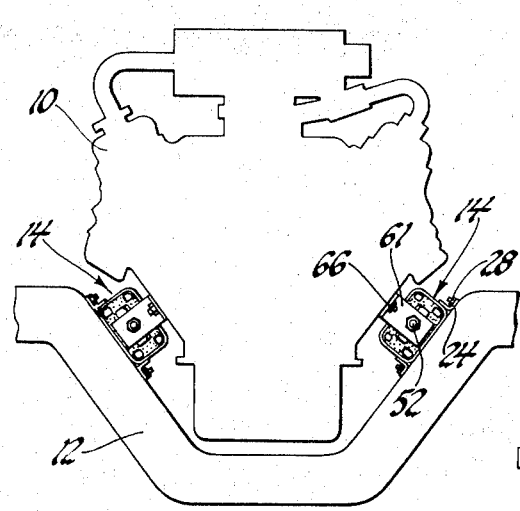
FIG. 1 is a front elevational view of an internal combustion engine resiliently supported on a frame of a motor vehicle by engine mount assemblies constructed according to the present invention.

Referring to FIG. 1, there is shown an internal combustion engine 10 which is supported at its opposite sides on a frame 12 of a motor vehicle by a pair of engine mount assemblies 14 constructed according to present invention. The mounts 14 act as the two forward points of a three-point type mounting system which has an additional centrally located rearward mount, not shown, whose attachment is between a transmission secured to the engine and a crossmember of the frame.

Figure 2:
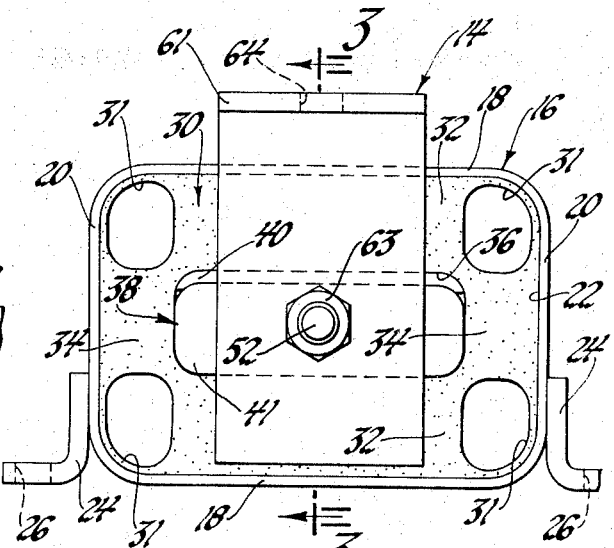
FIG. 2 is an enlarged elevational view of one of the engine mount assemblies in FIG. 1.
Figure 3:
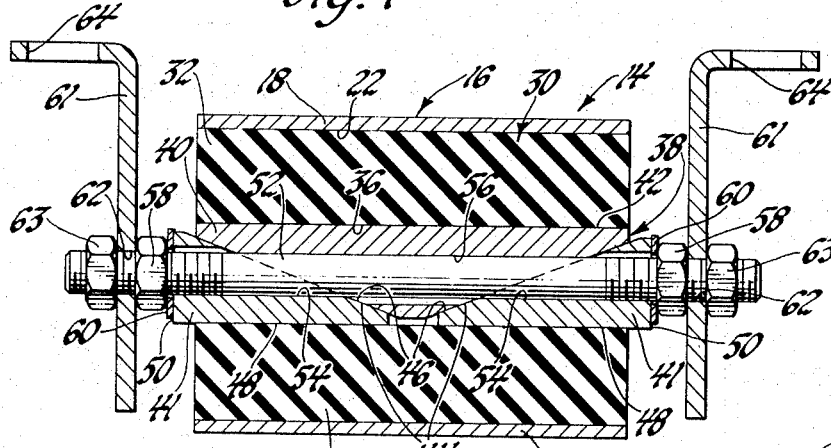
FIG. 3 is a view taken on the line 3—3 in FIG. 2.
Figure 4:
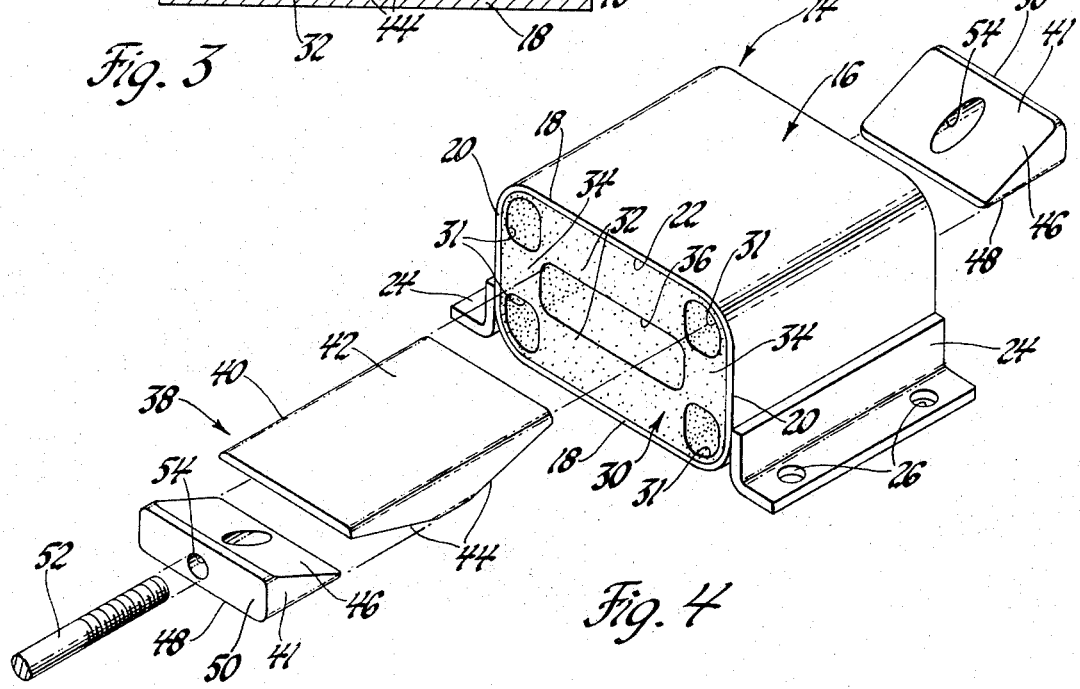
FIG. 4 is an exploded perspective view of the engine mount assembly in FIG. 2.

As shown in FIGS. 2, 3, and 4, each of the mount assemblies 14 comprises a sleeve 16 having a pair of parallel long sides or walls 18 and a pair of parallel short sides or walls 20 whose interior surfaces define a rectangularly shaped opening 22 extending therethrough. In addition, the sleeve 16 has a pair of legs 24 which are welded to the short sides 20 and have holes 26 through which bolts 28 extend to connect with the frame 12 as shown in FIG. 1.

A rectangularly shaped hollow body 30 of resilient material such as rubber is molded while not under load at its outer surface in the opening 22 of the sleeve to the interior surfaces of the sleeves' sides 18 and 20. The resilient body 30 has voids 31 at the four corners such that there are defined two pairs of rectangularly shaped resilient pads 32 and 34 wherein the pads in each pair have equal thickness. The pads 32 have longer sides than the pads 34 as viewed in FIG. 2 and are backed by the long sleeve sides 18 and the pads 34 which have shorter sides are backed by the short sleeve sides 20. The pairs of resilient pads 32 and 34 at their interior surfaces define a rectangularly shaped opening 36 that extends longitudinally of the body 30 and sleeve 16 parallel to the sleeve walls.

Spring rate adjusting means for adjusting the mount's spring rate comprises an expansible wedge block assembly 38 that is mounted in and contacts all sides of the opening 36 interior of the resilient pads 32 and 34. The wedge assembly 38 comprises a non-sliding wedge block 40 and a pair of sliding wedge blocks 41 which are all rectangular in cross-section to fit the opening 36. The wedge block 40 has an upper flat side 42 that contacts the entire inner surface or side of the upper resilient pad 32 and also has oppositely inclined ramps 44 on the other side that face toward the inner surface or side of the lower resilient pad 32. The sliding wedge blocks 41 each have a ramp 46 on one side that engages one of the ramps 44 of the wedge block 40 and a flat surface 48 on their other side which contacts the inner surface of the lower resilient pad 32, there being only a small region on this pad intermediate the inner ends of the sliding wedge blocks which is not contacted.

With this arrangement and on application of oppositely directed forces on outboard ends 50 of the sliding wedge blocks 41, the sliding wedge blocks are forced to move toward each other and as a result of the ramp engagement the wedge block 40 is moved toward the upper sleeve wall 18 to compress the upper resilient pad 32 while the two sliding wedge blocks 41 are forced to move in the opposite direction toward the lower sleeve side 18 and compress the lower resilient pad 32. The voids 31 in the resilient body 30 accommodate the displacement of resilient material that occurs during such compression of the pads 32 by the wedging action and also the compression of these pads that occurs during engine mount usage as well as the displacement of the pads 34 that occurs during engine mount usage when the wedge block assembly moves in the direction of the sleeve sides 20. The compression of the resilient pads 32 by the wedge block assembly 38 has the effect of increasing their spring rate primarily in the vertical direction as viewed in FIG. 2 and to a lesser extent in other directions such as the horizontal direction and without changing the spring rate provided by the other pair of resilient pads 34 since there is no compression of these pads caused by the wedge block assembly 38. Alternatively, the spring rate of the resilient pads 32 is reduced when the clamping force on the wedge block assembly 38 is reduced.

The clamping means for effecting the spring rate adjustment comprises a rod 52 which extends through a central opening 54 in each of the sliding wedge blocks 41 and also a central opening 56 in the non-sliding wedge block 40. The rod 52 is threaded at each end to receive a clamping nut 58, and a washer 60 is arranged intermediate each of the nuts 58 and the outboard end of one of the sliding wedge blocks 41. The opening 56 in wedge block 40 is elongated in the downward direction and the openings 54 in the other wedge blocks 41 are elongated in the upward or opposite direction to accommodate the relative movements of the wedge blocks to effect compression of the resilient pads 32 which occurs by tightening of the nuts 58, the wedge blocks being shown in their lowest spring rate position in FIG. 3.

The engine mount assembly 14 is connected to the engine 10 by a pair of engine mounting brackets 61 which each have a side having a hole 62 which receives one of the threaded ends of rod 52 and is secured to the rod by a nut 63 which clamps the bracket against the opposite nut 58. Each of the brackets 61 also has a leg having a hole 64 through which a bolt 66 extends to connect with the engine 10 as shown in FIG. 1.

Both of the engine mount assemblies 14 are arranged to cushion the vertical, lateral, and fore and aft movements of the engine 10 as shown in FIG. 1, these three directions being mutually perpendicular to each other. Preferably, each of the engine mounts 14 is arranged so that its central axis which coincides with the axis of rod 52 extends longitudinally or fore and aft of the vehicle and the sleeve 16 is angled so that the adjustable rate resilient pads 32 primarily resist both vertical and lateral engine motions in compression, the other resilient pads 34 primarily resisting engine roll in compression and all these pads resisting fore and aft motions in shear. The vertical and lateral engine motions are normally considered the primary factors in determining the proper spring rate system, and thus, the engine mount according to the present invention is well suited to this end.

Thus, the engine mount assembly according to the present invention has an adjustable rate provided by very simple structure for tuning to a wide range of engine-vehicle combinations, this tuning being accomplished by merely tightening or loosening the clamping nuts to increase or decrease the rate respectively. Furthermore, this adjustment of spring rate is available after, rather than before, the resilient material has been molded thereby eliminating shrinkage stress and increasing fatigue life of the resilient material.

The above described embodiment is illustrative of the invention which may be modified within the scope of the appended claims.

I claim:

1. An engine mount assembly for resiliently supporting an engine on a frame comprising first mounting means including a multi-sided sleeve having an opening extending therethrough, two pairs of resilient pads mounted in said sleeve opening with the resilient pads in each pair arranged opposite each other, each of said resilient pads having an outer side molded to an inner surface of one of said sleeve sides of said sleeve, said two pairs of resilient pads having inner sides defining a rectangularly shaped opening extending longitudinally of said sleeve, spring rate adjusting means comprising three wedge blocks mounted in and having a shape conforming to and filling said opening interior of said resilient pads with one of said wedge blocks arranged between the other two wedge blocks, said one wedge block having one side contacting the inner side of one of said resilient pads of one of said pairs and another side facing the other resilient pad of said one pair having oppositely inclined ramps extending transverse to said opening interior of said resilient pads, said other wedge blocks each having one side with a ramp mating with one of said ramps on said one wedge block and another side contacting the inner side of the other resilient pad of said one pair so that when said other wedge blocks are forced to move toward each other said one wedge block is forced to move in one direction toward one side of said sleeve to compress said one resilient pad between said one wedge block and said one sleeve side while said other wedge blocks are forced to move in the opposite direction toward another side of said sleeve to compress said other resilient pad between said other wedge blocks and said other sleeve side whereby the spring rate of said one pair of resilient pads is increased without changing the spring rate of the other pair of resilient pads, second mounting means including clamp means for applying a clamping force to force said other wedge blocks together to compress said one pair of resilient pads.

2. An engine mount assembly for resiliently supporting an engine on a frame comprising first mounting means including a four-sided sleeve having a rectangular opening extending therethrough, two pairs of rectangularly shaped resilient pads mounted in said sleeve opening with the resilient pads in each pair arranged opposite each other, each of said resilient pads having an outer side molded to an inner surface of one of said sides of said sleeve, said two pairs of resilient pads having inner sides defining a rectangularly shaped opening extending longitudinally of said sleeve, spring rate adjusting means comprising three wedge blocks mounted in and having a shape conforming to and filling said opening interior of said resilient pads with one of said wedge blocks arranged between the other two wedge blocks, said one wedge block having one side contacting the inner side of one of said resilient pads of one of said pairs and another side facing the other resilient pad of said one pair having oppositely inclined ramps extending transverse to said opening interior of said resilient pads, said other wedge blocks each having one side with a ramp mating with one of said ramps on said one wedge block and another side contacting the inner side of the other resilient pad of said one pair so that when said other wedge blocks are forced to move toward each other said one wedge block is forced to move in one direction toward one side of said sleeve to compress said one resilient pad between said one wedge block and said one sleeve side while said other wedge blocks are forced to move in the opposite direction toward another side of said sleeve to compress said other resilient pad between said other wedge blocks and said other sleeve side whereby the spring rate of said one pair of resilient pads is increased without changing the spring rate of the other pair of resilient pads, said wedge blocks having openings therethrough that are aligned and extend longitudinally of said opening interior of said resilient pads, second mounting means including clamp means having a rod extending with substantial radial clearances through the openings in said wedge blocks for applying a clamping force to outer ends of said other wedge blocks to force said other wedge blocks together while the clearances between said rod and said wedge blocks in said wedge block openings permits movement of said wedge blocks relative to said rod to compress said one pair of resilient pads.

* * * * *